United States Patent
Esposito et al.

(10) Patent No.: US 7,283,894 B2
(45) Date of Patent: Oct. 16, 2007

(54) SYSTEM AND METHOD FOR FLUID REGULATION

(75) Inventors: Sandro Esposito, Bridgewater, MA (US); John Thurman Payne, Kingsland, TX (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 11/352,428

(22) Filed: Feb. 10, 2006

(65) Prior Publication Data

US 2007/0191989 A1    Aug. 16, 2007

(51) Int. Cl.
G05D 7/00 (2006.01)
(52) U.S. Cl. .................... 700/282; 137/487.5; 73/1.72
(58) Field of Classification Search .............. 700/80, 700/281, 282, 283, 284, 285; 137/468, 487.5, 137/488; 73/1.59, 1.57, 1.71, 1.72; 702/182, 702/183, 189
See application file for complete search history.

(56) References Cited

U.S. PATENT DOCUMENTS

| | | |
|---|---|---|
| 4,029,122 A | 6/1977 | Jaegtnes |
| 4,263,997 A | 4/1981 | Poore |
| 4,274,438 A | 6/1981 | La Coste |
| 4,481,451 A | 11/1984 | Kautz et al. |
| 4,509,403 A | 4/1985 | Gassman et al. |
| 4,523,286 A | 6/1985 | Koga et al. |
| 4,542,649 A | 9/1985 | Charbonneau et al. |
| 4,556,956 A | 12/1985 | Dickenson et al. |
| 4,690,003 A | 9/1987 | McNennamy et al. |
| 4,693,113 A | 9/1987 | McNennamy et al. |
| 4,712,173 A | 12/1987 | Fujiwara et al. |
| 4,831,873 A | 5/1989 | Charbonneau et al. |
| 4,856,327 A | 8/1989 | Branam et al. |
| 4,860,596 A | 8/1989 | Charbonneau et al. |
| 4,896,101 A | 1/1990 | Cobb |
| 4,976,144 A | 12/1990 | Fitzgerald |
| 5,049,764 A | 9/1991 | Meyer |
| 5,070,846 A | 12/1991 | Dudek et al. |
| 5,109,692 A | 5/1992 | Fitzgerald |
| 5,197,328 A | 3/1993 | Fitzgerald |

(Continued)

FOREIGN PATENT DOCUMENTS

DE        39 11 259 A1    10/1990

(Continued)

OTHER PUBLICATIONS

Fisher Bulletin 62.1:VL1000: DVC5000, DVC5000(S1); DT4000; Jun. 1994, pp. 1-26.

(Continued)

*Primary Examiner*—Leo Picard
*Assistant Examiner*—Charles Kasenge
(74) *Attorney, Agent, or Firm*—Fish & Richardson P.C.

(57) ABSTRACT

Systems and processes for fluid regulation may provide diagnostic information that is useful for evaluating the condition and/or needed repairs/maintenance for fluid regulation systems. In particular implementations, a system and process for fluid regulation may include the ability to receive a representation of an input signal to an electric-to-pressure converter for facilitating positioning of a fluid regulator component, the electric-to-pressure converter adapted to be part of a fluid regulation system including a fluid regulator and a fluid regulator controller, and to determine at least one fluid regulation system condition based on the converter input signal.

20 Claims, 3 Drawing Sheets

U.S. PATENT DOCUMENTS

| | | | |
|---|---|---|---|
| 5,249,954 | A | 10/1993 | Allen et al. |
| 5,251,148 | A | 10/1993 | Haines et al. |
| 5,272,647 | A | 12/1993 | Hayes |
| 5,329,465 | A | 7/1994 | Arcella et al. |
| 5,425,270 | A | 6/1995 | McDonald et al. |
| 5,431,182 | A | 7/1995 | Brown |
| 5,469,737 | A | 11/1995 | Smith et al. |
| 5,524,484 | A | 6/1996 | Sullivan |
| 5,526,690 | A | 6/1996 | Louie et al. |
| 5,533,544 | A | 7/1996 | Good et al. |
| 5,543,696 | A | 8/1996 | Huggett et al. |
| 5,549,137 | A | 8/1996 | Lenz et al. |
| 5,573,032 | A | 11/1996 | Lenz et al. |
| 5,594,175 | A | 1/1997 | Lyon et al. |
| 5,616,824 | A | 4/1997 | Abdel-Malek et al. |
| 5,654,885 | A | 8/1997 | Mayhew et al. |
| 5,684,451 | A | 11/1997 | Seberger et al. |
| 5,687,098 | A | 11/1997 | Grumstrup et al. |
| 5,715,178 | A | 2/1998 | Scarola et al. |
| 5,847,952 | A | 12/1998 | Samad |
| 5,878,765 | A | 3/1999 | Lange |
| 5,884,894 | A | 3/1999 | Smith |
| 5,892,690 | A | 4/1999 | Boatman et al. |
| 5,966,679 | A | 10/1999 | Snowbarger et al. |
| 5,970,430 | A | 10/1999 | Burns et al. |
| 5,992,229 | A | 11/1999 | Pyotsia et al. |
| 6,016,875 | A | 1/2000 | Orbach et al. |
| 6,035,878 | A | 3/2000 | Adams et al. |
| 6,049,764 | A | 4/2000 | Stahl |
| 6,155,283 | A | 12/2000 | Hansen et al. |
| 6,192,321 | B1 | 2/2001 | Grumstrup et al. |
| 6,272,401 | B1 | 8/2001 | Boger et al. |
| 6,453,261 | B2 | 9/2002 | Boger et al. |
| 6,466,893 | B1 | 10/2002 | Latwesen et al. |
| 6,505,145 | B1 | 1/2003 | Bjornson |
| 6,678,584 | B2 | 1/2004 | Junk et al. |
| 6,745,084 | B2 | 6/2004 | Boger et al. |
| 6,804,618 | B2 * | 10/2004 | Junk .......................... 702/182 |
| 6,862,547 | B2 | 3/2005 | Snowbarger et al. |
| 6,954,683 | B2 | 10/2005 | Junk et al. |
| 7,039,537 | B2 | 5/2006 | Junk |
| 7,079,021 | B2 | 7/2006 | Snowbarger et al. |
| 2001/0032518 | A1 | 10/2001 | Boger et al. |
| 2001/0037159 | A1 | 11/2001 | Boger et al. |
| 2001/0037670 | A1 | 11/2001 | Boger et al. |
| 2002/0052712 | A1 | 5/2002 | Voser et al. |
| 2003/0144747 | A1 | 7/2003 | Shakespeare |

FOREIGN PATENT DOCUMENTS

| | | |
|---|---|---|
| DE | 195 40 441 A1 | 4/1997 |
| EP | 0 571 080 A | 11/1993 |
| EP | 0 660 017 A | 6/1995 |
| JP | 08018329 | 7/1997 |
| JP | 09189370 | 7/1997 |
| JP | 10-336238 | 12/1998 |
| WO | WO 01/11436 A1 | 2/2001 |

OTHER PUBLICATIONS

Fisher Bulletin 62.1:DT4000(S1); Sep. 1994, pp. 1-8.
Fisher Bulletin 62.1:DT4000; Dec. 1995, pp. 1-12.
Foxboro/Eckardt SRD991 Product Information. Oct. 1995, pp. 1-2.
Hartmann & Braun, Intelligent Positioner TZID—Product Information, published at least before filing date of application, pp. 1-2.
Honeywell, Series EP2300 Electro-pneumatic positioner—Product Information, published at least before filing date of application, pp. 1-4.
Moore, ValvePAC Intelligent Valve Control—Product Information, published at least before filing date of application, pp. 1-5.
Neles-Jamesbury, The ND800 Valve Controller—Product Information, published at least before filing date of application, pp. 1-4.
Samson, Product Information, published at least before filing date of application, pp. 1-23.
Siemens, SIRPART PS—Product Information, published at least before filing date of application, pp. 1-6.
Valtek, Logix/StarPac/StarPacII—Product Information, published at least before filing date of application, pp. 1-17.
IcoT—Smart Positioner Product Information, published at least before filing date of application, pp. 1-17.
Worcester Controls, Pulsair—Product Information, published at least before filing date of application, pp. 1-25.
Yokogawa, ValveManager—Product Information, published at least before filing date of application, pp. 1-25.
IEEE Press, The Authoritative Dictionary IEEE Standard Terms 2000, Standards Information Network IEEE Press, 7th edition, Dec. 2000, p. 422.
European Patent Office, European Search Report for Application No. EP 03 40 0057 dated Feb. 4, 2005 (3 pages).
European Patent Office, European Search Report for Application No. 98 93 4660 dated Dec. 18, 2001 (4 pages).
WIPO, International Search Report for PCT/US98/14978 dated Jul. 20, 1998 (4 pages).
European Patent Office, European Search Report for Application No. EP 04 01 0177 dated Jul. 15, 2004 (3 pages).
European Patent Office, European Search Report for Application No. EP 04 01 0179 dated Apr. 8, 2005 (3 pages).
European Patent Office, European Search Report for Application No. EP 04 01 0178 dated Apr. 8, 2005 (3 pages).
PCT International Search Report, PCT/US04/04039, Jul. 6, 2005, pp. 1-2.
"Non-Invasive Diagnostics of Motor-Operated Valves", Jangobom Chai, Ajou University, Proceedings of the American Control Conference, Jun. 1994, pp. 2006-2012.
*"Making Valve Controllers/Positioners Smarter is Smart Business"*, Harold, Dave, From the pages of Control Engineering, Jan. 1, 2003, [retrieved on Dec. 20, 2006], Retrieved from http://www.controleng.com/index.asp?layout=articlePring&articleid=CA269795; or http://www.manufacturing.net/clt/article/CA269795.htm.
*"Digitally Mastered"*, Reprint from Control and Instrumentation, Nov. 2004 [retrieved on Dec. 20, 2006], Retrieved from http://www.documentation.emersonprocess.com/groups/public/documents/articles_articlesreprings/d350813x012.pdf#search=%22ESD%20trip%20signature%22.
*"Process Safety What are the Odds?"*, Harold, Dave, From the pages of Control Engineering, Apr. 1, 2005 [retrieved on Dec. 20, 2006], Retrieved from http://www.contoleng.com/index.asp?layout=articlePrint&articleID=CA515956 or http://www.manufacturing.net/ctl/index.asp?layout=articlePrint&articleID=CA515956.

* cited by examiner

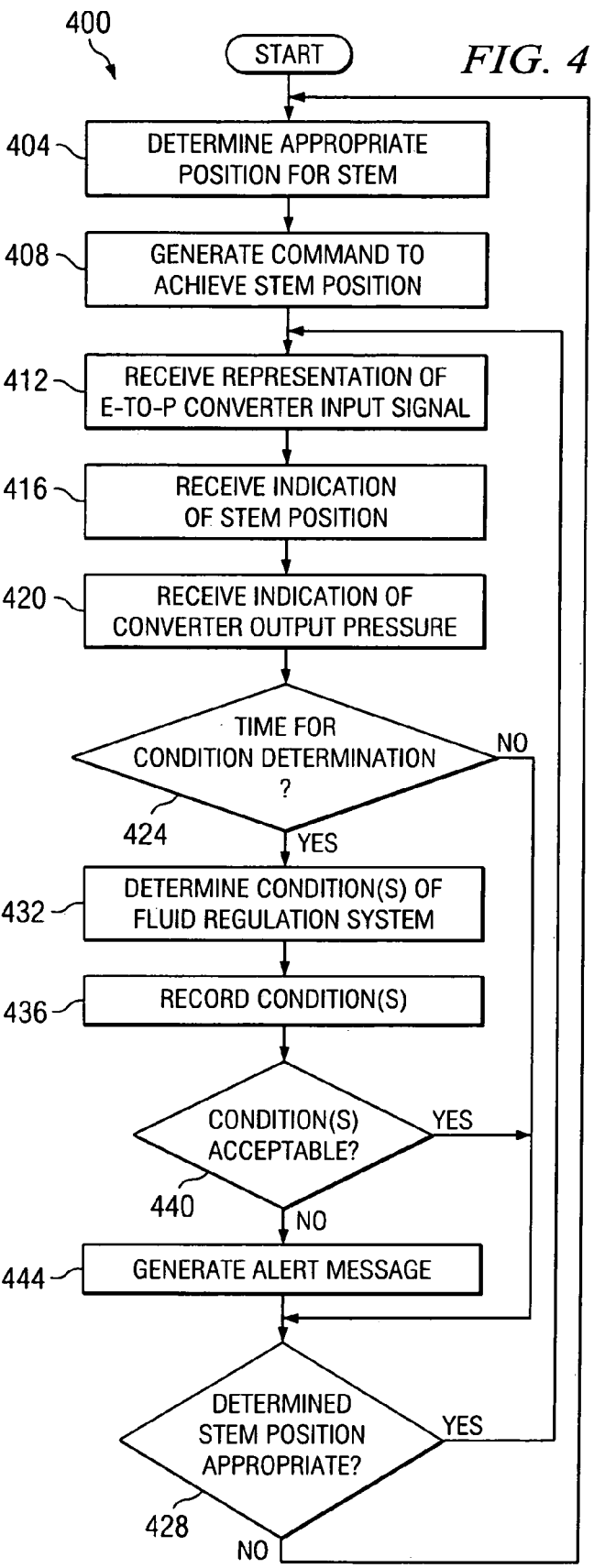

SYSTEM AND METHOD FOR FLUID REGULATION

TECHNICAL FIELD

This invention relates to fluid processes and, more particularly, to fluid process regulation.

BACKGROUND

Process systems are being operated longer and longer (e.g., five to eight years) between shutdowns that are short and shorter (e.g., thirty to forty-five days). Moreover, the control valves of many process systems are being operated within five to ten percent of a particular position over most of their period of service. These circumstances result in control valves being operated longer and closer to the end of their operational life.

Traditional diagnostic techniques for control valves have involved taking a process system offline and removing the control valve from the process system. The control valve is then sent to a laboratory where characteristic signatures are made and compared to baselines. Performance characteristics such as dead band, hysteresis, and full-stroke operation may be characterized. Unfortunately, this type of diagnostic technique is time consuming and costly to perform (e.g., sometimes requiring extensive effort to remove insulation, heat traces, and steam traces from the control valve and a crane to remove the control valve from the process system), leading to large process system downtime and expense.

SUMMARY

Fluid regulation techniques may provide diagnostic information that is useful for evaluating one or more conditions of fluid regulation systems. In one general aspect, a process for fluid regulation includes receiving a representation of an input signal to an electric-to-pressure converter for facilitating positioning of a fluid regulator component, the electric-to-pressure converter adapted to be part of a fluid regulation system including a fluid regulator and a fluid regulator controller, and determining at least one fluid regulation system condition based on the converter input signal.

In certain implementations, determining at least one fluid regulation system condition based on the converter input signal may include determining at least one fluid regulation system condition based on the converter input signal and at least one of a fluid regulator parameter or a fluid regulator controller parameter.

The fluid regulation system condition may, for example, be a condition of a supply pressure, the electric-to-pressure converter, or a fluid regulator. Determining a supply pressure condition may include examining the converter input signal level to determine a material variance therefrom. Determining the condition of the supply pressure may further include examining a fluid regulator component position and an output pressure of the electric-to-pressure converter.

Determining at least one fluid regulation system condition may include determining whether the converter input signal is outside an acceptable range. Determining whether the converter input signal is outside an acceptable range may include compensating for normal operating variations of the converter input signal. Determining the fluid regulation system condition may also include determining the amount of time that the converter input signal is outside of the acceptable range. In particular implementations, if the converter input signal is outside an acceptable range for too long of a period of time (e.g., 5-10 s), it may indicate a problem with the system.

The process may also include generating a message representative of the fluid regulation system condition. The message may, for example, be an alert message generated if a fluid regulation system condition is unacceptable.

In another general aspect, a system for fluid regulation may include an electric-to-pressure converter and a processor. The electric-to-pressure converter may be operable to receive an input signal for positioning a fluid regulator component and to generate an appropriate pressure in response thereto. The processor is coupled to the electric-to-pressure converter and may be operable to receive a representation of the converter input signal and to determine at least one fluid regulation system condition based on the converter input signal.

The fluid regulation system condition may, for example, be a condition of a supply pressure, the electric-to-pressure converter, or a fluid regulator. Determining a supply pressure condition may include examining a fluid regulator component position and an output pressure of the electric-to-pressure converter.

Determining at least one fluid regulation system condition may include determining whether the converter input signal is outside an acceptable range. The processor may be further operable to generate a message representative of the fluid regulation system condition.

Determining at least one fluid regulation system condition based on the converter input signal may include determining at least one fluid regulation system condition based on the converter input signal and at least one of a fluid regulator parameter or a fluid regulator controller parameter. In particular implementations, the system may include a fluid regulator having a stem, a position sensor for sensing a position of the stem, a temperature sensor for sensing the temperature of the fluid regulation system environment, and/or a pressure sensor for sensing the output pressure of the electric-to-pressure converter. The processor may be operable to determine the fluid regulation system condition based on the converter input signal and the system position, the environment temperature, and/or the converter output pressure.

In one aspect, a system for fluid regulation includes a fluid regulator and a fluid regulator controller. The fluid regulator includes a stem, and the fluid regulator controller is coupled to the fluid regulator. The fluid regulator controller includes a processor and an electric-to-pressure converter coupled to the processor. The converter is operable to receive an input signal for positioning the stem and to generate an appropriate pressure in response thereto. The system also includes a position sensor for sensing a position of the stem, a temperature sensor for sensing the temperature of the fluid regulation system environment, and a pressure sensor operable to sense the output pressure of the electric-to-pressure converter. The processor is operable to receive a representation of the converter input signal, the stem position, the environment temperature, and the converter output pressure and to determine at least one fluid regulation system condition based on the converter input signal and one or more of the stem position, the system temperature, and the converter output pressure.

The fluid regulation techniques may have one or more features. For example, by being able to determine a condition of a fluid regulation system while it is in operation, problems with the system may be identified without having to take the system off-line, which may be time consuming, labor intensive, and expensive. Also, it may be determined that a fluid regulation system does not need to be taken off-line—for routine inspection, for example—which may save time, labor, and expense. Furthermore, by being able to understand problems with a fluid regulation system before it is taken off-line, plans may be made for time, labor, and parts to fix the system.

The details of one or more implementations are set forth in the accompanying drawings and the description below. Other features will be apparent from the description and drawings, and from the claims.

DESCRIPTION OF DRAWINGS

FIG. 4 is a flow chart illustrating one example of a process for fluid regulation.

Like reference symbols in the various drawings indicate like elements.

DETAILED DESCRIPTION

Fluid regulation may be achieved by a fluid regulator (e.g., a valve) that is controlled by a fluid regulator controller (e.g., a valve positioner). Determining one or more conditions of a fluid regulation system that includes a fluid regulator and/or a fluid regulator controller may lead to improved fluid regulation. In particular implementations, a condition of a fluid regulation system may be determined by examining an input signal to an electric-to-pressure converter. Based on this examination, determinations may be made regarding one or more system conditions, such as, for example, supply pressure stability, electric-to-pressure converter performance, and/or fluid regulator health.

Figure 1:
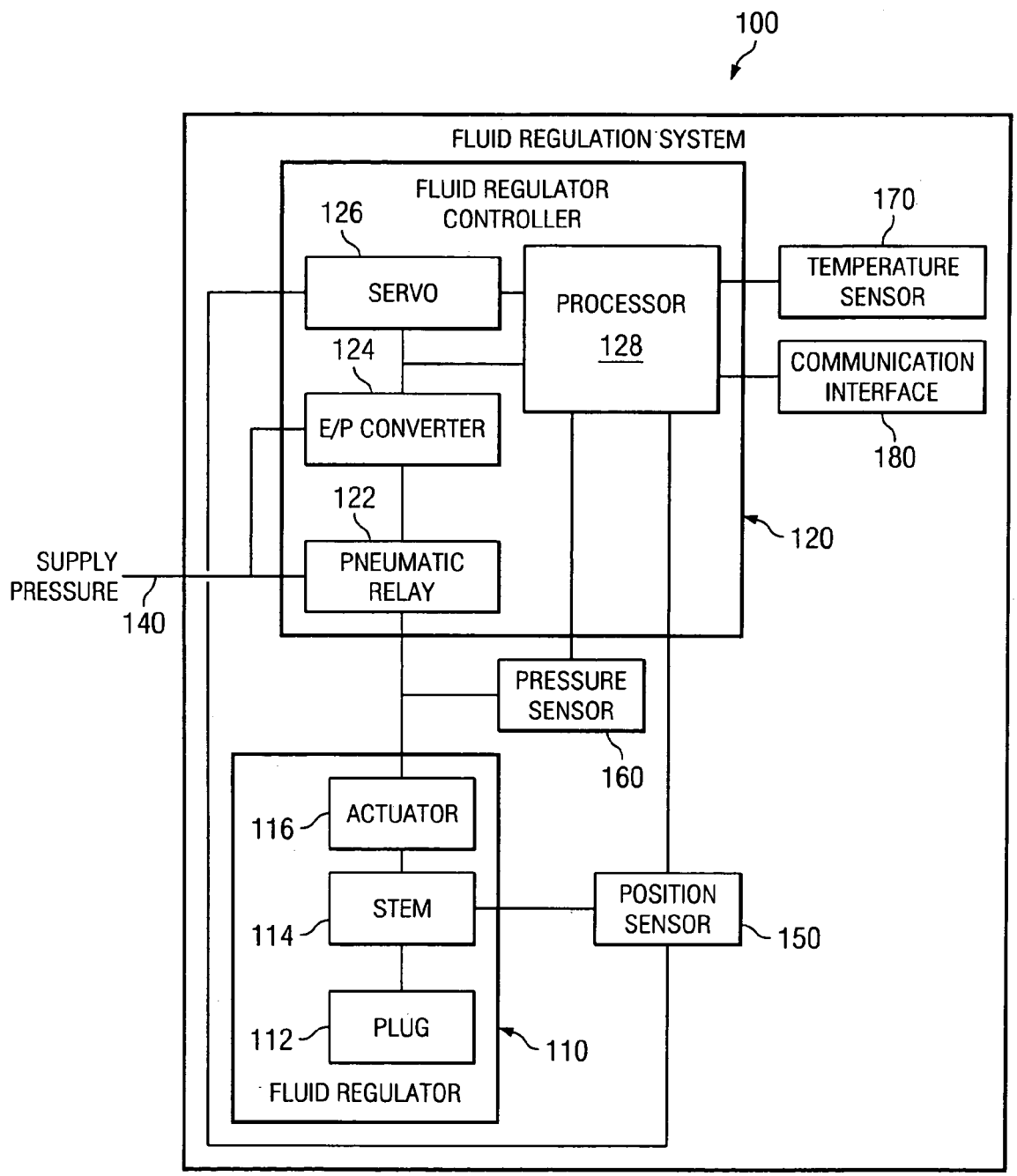
FIG. 1 is a block diagram illustrating one example of a system for fluid regulation.

FIG. 1 illustrates one implementation of a fluid regulation system 100. Fluid regulation system 100 includes a fluid regulator 110 and a fluid regulator controller 120. Fluid regulator 110 physically interacts with a fluid (liquid and/or gas) to affect it, and fluid regulator controller 120 controls fluid regulator 110 and, hence, regulates the fluid.

In more detail, fluid regulator 110 includes a plug 112, a stem 114, and an actuator 116. Plug 112 is responsible for interfacing with a fluid to be regulated to alter its characteristics (e.g., flow and/or pressure). To affect the fluid, plug 112 typically moves within a volume in which the fluid exists, which may or may not be part of the fluid regulator. Plug 112 may be composed of plastic, metal, rubber, composite, and/or any other appropriate material. Stem 114 is coupled to plug 112 and is responsible for communicating force to move plug 112 relative to the regulated fluid. Stem 114 may, for example, be a rod or shaft that is composed of metal. Actuator 116 is coupled to stem 114 and is responsible for moving the stem and, hence, plug 112. In this implementation, actuator 116 is a pneumatic actuator that receives a control pressure from fluid regulator controller 120. Actuator 116 may, for example, include a piston subjected to differential pressure or a pressure-activated spring. In other implementations, actuator 116 may operate using any other appropriate technique (e.g., hydraulic). In particular implementations, fluid regulator 110 may be a valve (e.g., a globe valve). In other implementations, however, fluid regulator 110 may be any other appropriate device for affecting a fluid.

Fluid regulator controller 120, which may, for example, be a valve positioner, includes a pneumatic relay 122, an electric-to-pressure converter 124, a servo 126, and a processor 128. Pneumatic relay 122 is coupled to actuator 116 and is responsible for boosting the pressure and/or flow rate of a flow from electric-to-pressure converter 124 to provide a control pressure to actuator 116. Pneumatic relay 122 also receives a supply pressure from a supply line 140. Electric-to-pressure converter 124 is coupled to pneumatic relay 122 and is responsible for converting electrical control signals (current and/or voltage) to pressure signals for pneumatic relay 122. To accomplish this, electric-to-pressure converter 124 may, for example, include a cup core, a coil of wire surrounding a central-post amature of the core, and a movable, magnetizable flexure, which may be a hinged flapper. To adjust pressure, the flexure may move relative to an orifice of a passage through which a supply pressure is vented to a pressure cavity. By adjusting the force on the flexure relative to the orifice, the pressure in the pressure cavity may be adjusted. In the illustrated implementation, electric-to-pressure converter 124 is pneumatically powered and receives a pressure from supply line 140. In other implementations, electric-to-pressure converter 124 may operate using any other appropriate technique (e.g., hydraulic).

Servo 126 is coupled to electric-to-pressure converter 124 and is responsible for generating electrical control signals for electric-to-pressure converter 124. Servo 126 may, for example, be a proportional-integral-derivative (PID) controller. Processor 128 is coupled to servo 126 and is responsible for determining how to control plug 112. Processor 128 may, for example, be a microprocessor, a field-programmable gate array, an analog processor, or any other appropriate device for manipulating information in a logical manner. Processor 128 typically includes memory, which may be random-access memory (RMA), read-only memory (ROM), compact-disk read-only memory (CD-ROM), registers, and/or any other appropriate device for storing information. The memory may store instructions for the processor, data regarding fluid regulation system 100, and/or other appropriate information.

Fluid regulation system 100 also includes a position sensor 150, a pressure sensor 160, and a temperature sensor 170. Position sensor 150 is responsible for determining the position of stem 114, which correlates with the position of plug 112, and providing this information to servo 126 and processor 128. Position sensor 150 may operate by electrical, electromagnetic, optical, and/or mechanical techniques and may or may not be actually coupled to stem 114. In particular implementations, position sensor 150 may be a Hall-effect sensor. Pressure sensor 160 is coupled to the pressure line between pneumatic relay 122 and actuator 116 and is responsible for determining the pressure in the line and providing this information to processor 128. Pressure sensor 160 may, for example, be a piezo-type sensor. Temperature sensor 170 is responsible for determining the temperature in and/or around fluid regulation system 100 and providing this information to processor 128. Temperature sensor 170 may, for example, be a resistive-temperature device or a thermocouple.

Fluid regulation system 100 additionally includes a communication interface 180. Communication interface 180 is coupled to processor 128 and allows the processor to send and receive information outside of fluid regulation system 100. The sent information may, for example, include one or more conditions of the regulated fluid and/or the fluid regulation system. The received information may, for example, include commands and/or instructions for regulating the fluid and/or status inquiries. Communication interface 180 may be a modem, a network interface card, or any other appropriate device for sending and receiving information. The communication interface may operate by wireline (e.g., IEEE 802.3, Foundation Fieldbus, or 4-20 mA) or wireless (e.g., IEEE 802.11, IS-95, or IS-136) techniques.

In one mode of operation, processor 128 determines the appropriate position for plug 112, perhaps based on instructions received through communication interface 180, and generated a signal representative of the position for servo 126. In particular implementations, the signal may form or be part of a structured message (e.g., a packet). Servo 126 determines the appropriate command signal for electric-to-pressure converter 124 based on the signal from processor 128 and the current position of stem 114, which it receives from position sensor 150, and sends the command signal to electric-to-pressure converter 124. Electric-to-pressure converter 124 converts the command signal to a pressure, which is sent to pneumatic relay 122. Pneumatic relay 122 increases the pressure and provides this to actuator 116, which attempts to move stem 114, and, hence, plug 112, in accordance with the applied pressure.

Also during operation, position sensor 150 monitors the position of stem 114 and provides a signal representing the position to servo 126 and processor 128. Servo 126 compares the determined position for stem 114 with the position sensed by position sensor 150 and adjusts the command signal to electric-to-pressure converter 124 to achieve the appropriate position. In addition to the stem position, processor 128 receives information regarding the input signal to electric-to-pressure converter 124, the pressure signal from pneumatic relay 122 to actuator 116 (from pressure sensor 160), and the environment temperature (from temperature sensor 170). Processor 128 can then determine whether any adjustments need to be made regarding the determined position and/or whether the fluid regulation system is behaving properly (e.g., by examining position response time), which may also require adjustments.

If adjustments should be made, processor 128 can generate another signal for servo 126. Additionally, processor 128 may generate signals representing the status (parameter values and/or condition) of fluid regulation system 100 and send the signals through communication interface 180. A status signal may be sent in response to a query received through the communication interface. Also, an alert signal, possibly of an appropriate level, may be generated if conditions warrant. In certain implementations, the alert signal may correspond to a color that represents the health of the fluid regulation system. In particular implementations, the signals may form or be part of a structured message.

By examining the input signal to electric-to-pressure converter 124, processor 128 may determine a variety of conditions regarding fluid regulation system 100. These may be used to provide an indication of whether a problem (e.g., damage, malfunction, or maintenance requirement) is occurring and suggest an action to be taken to correct the indicated problems. For example, the converter input signal may provide an indication of how hard actuator 116 is working. If the actuator begins working too hard (e.g., above 80% capacity), there is a danger that control will be lost. An appropriate alert could be generated if the actuator begins to work too hard. As another example, the converter input signal may be sensitive enough (particularly in situations where high-gain control relays are used) to indicate small decreases in supply pressure, typically well below the level where the pressure actually gets to the point that fluid regulator control is lost. On a more general level, the converter input signal can be used to diagnose fluid regulation system pressure-area problems, problems with the electric-to-pressure converter, and mechanical problems in the fluid regulation system. As an additional example, if using an unbalanced plug, the actuator has to supply more force to seat the plug. This is indicated by an increase in the converter input signal. Thus, the converter input signal may be an indicator of the amount of work that the actuator is being asked to do to position the valve plug.

Identifying a problem may, for example, be accomplished by fluid regulator controller 120, a supervisory system (e.g., a remote monitoring/control site), or an operator. Fluid regulator controller 120 may, for instance, diagnose a problem using one or more of the above described techniques and generate a representative signal to be sent to the supervisory system. As another example, the supervisory system may receive data from the fluid regulator controller and perform a determination. As a further example, an operator at the supervisory system may monitor data from the fluid regulator controller and perform a determination.

In particular implementations, if a problem is identified, corrective action (e.g., repair and/or maintenance) may be suggested. This may be accomplished, for example, by maintaining a database of problems and suggested corrective actions. In certain implementations, the suggested corrective action may be used to trigger an automatic correction of the problem. For example, the fluid regulator controller may place the valve into a safe mode if an unsafe condition is detected (e.g., excessive oscillations).

In certain implementations, the level of the converter input signal may be used as a trigger for determining whether a problem is occurring with a fluid regulation system. For example, various operating points of the signal may be used to determine the tendency of a problem. For instance, an operating point may be set at two-thirds of the maximum converter input signal to generate an alert or take action as a result of the movement of the signal toward the direction of being out of control. Operating points may also be used to generate conclusions regarding the cause of fluid regulation system problems and/or corrections for remedying the problems. Various operating points may be used to generate different levels of alerts.

Figure 2:
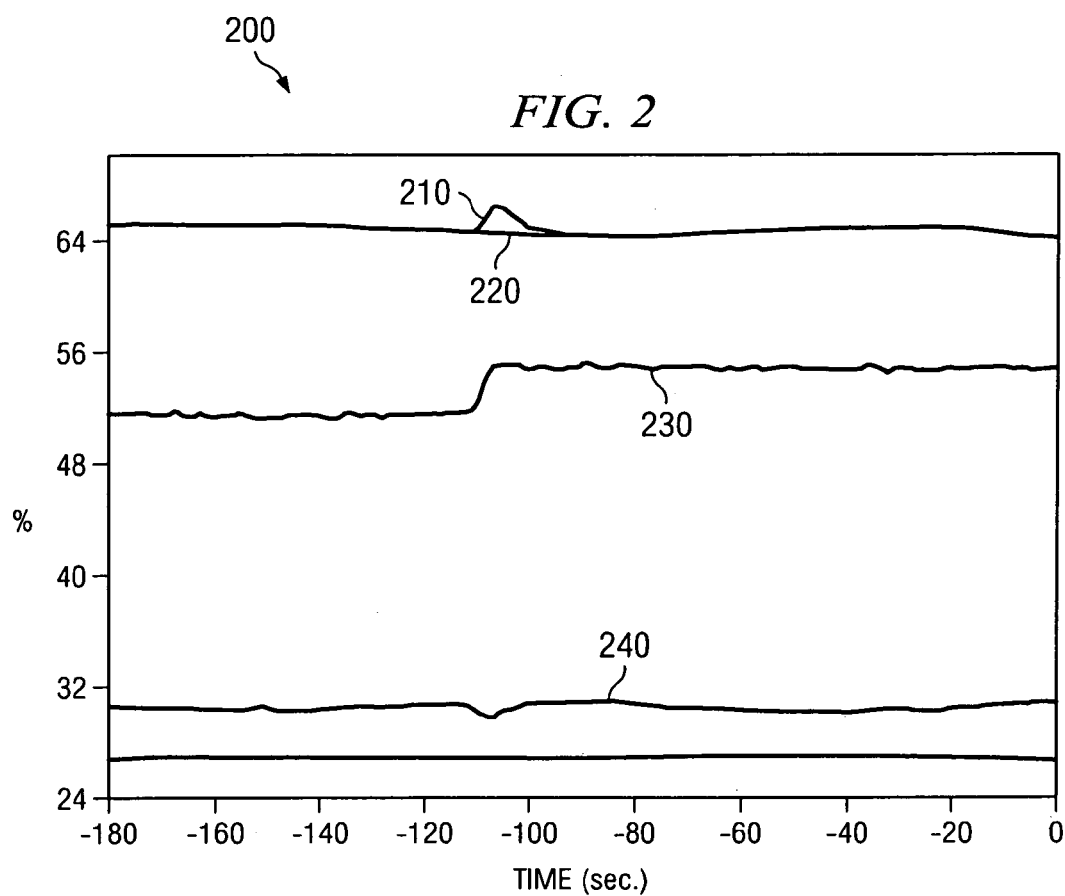
FIG. 2 is a graph illustrating one example of data for fluid regulation.

FIG. 2 illustrates a graph 200 presenting one example of the effects of a change in supply pressure to an electric-to-pressure converter and/or a relay. Graph 200 may, for example, be part of a user interface. Graph 200 depicts four different operating variables—a stem position 210, a target stem position 220, an electric-to-pressure converter input signal 230, and a relay output pressure 240. Graph 200 presents the variables as percentages of their maximum value versus time.

From −180s to −110s, the operating variables indicate a fairly steady operating mode. For example, stem position 210 is tracking target stem position 220, and input signal 230 and relay output pressure 240 are fairly steady. At −110s, however, there is a deviation in stem position 210 from target stem position 220 and a drop in relay output pressure 240, which caused the deviation in stem position 210. In this case, the drop in relay output pressure 240 was caused by a two pound drop (e.g., from 18 to 16 psig) in supply pressure. Also, there is a step-wise increase in converter input signal 230, to try to compensate for the deviation of stem position 210.

The increase in converter input signal 230 causes relay output pressure 240 to return to its previous level, and this causes stem position 210 to return to its previous level.

However, converter input signal 230 does not return to its previous level. This is because the electric-to-pressure converter is having to be driven harder to achieve the previous level of relay output pressure 240 since the drop in supply pressure.

By examining the change in converter input signal 230 in combination with the change in stem position 210 and relay output pressure 240, a diagnosis may be made that a change in supply pressure occurred. Moreover, this diagnosis may be provided for small changes in supply pressure. For example, FIG. 2 illustrates the result of a 10% change in supply pressure. Supply pressure changes below 5%, possibly even lower than 2%, could be similarly detected. For instance, a change of one psi in supply pressure may result in a 2% change in converter input signal. This may provide an indication of a problem well before control of the fluid regulator is lost.

On a more general level, FIG. 2 illustrates that by examining the converter input signal in combination with other measured fluid regulation system parameters—stem position and output pressure, in this illustration—a diagnostic determination may be made regarding a condition of the fluid regulation system. In other implementations, the converter input signal could provide information regarding other components of a fluid regulation system—for example, the electric-to-pressure converter and/or the fluid regulator.

For instance, during normal operation, there are typically corresponding changes in stem position and converter input signal. Thus, if the stem position unexpectedly changes without a corresponding converter input signal change, it may indicate a malfunction in the fluid regulator (e.g., sticking or a broken spring). As another example, a change in converter input signal may indicate a leak in the actuator or in the pneumatic path between the electric-to-pressure converter and the actuator. As an additional example, a change in converter input signal may indicate a faulty membrane in the electric-to-pressure converter. In general, changes in converter input signal may indicate a problem with system pneumatics. As a further example, a change in converter input signal with no change in stem position may indicate a stem blockage. Because the converter input signal generally indicates when the actuator is working harder, the signal may be used to diagnose a variety of mechanical conditions with a fluid regulation system.

In particular implementations, the converter input signal may oscillate over a small range during normal operations. For example, converter input signal 230 oscillates a few tenths of a percent between −180s and −110s. Thus, allowances may have to be made for this variation. In certain implementations, a band of acceptable variance may be used to determine when a material change has or has not occurred.

In certain implementations, the converter input signal may be viewed as a function of supply pressure, actuator input pressure, temperature, vibration, and the converter operation (e.g., contamination resulting in plugging could be an example of an operating problem). In the illustrated implementation, since temperature and actuator input pressure are measure, an acceptable band of operation can be used to define a normal operation range. Moreover, because actuator input pressure is measured, the parameters of which the pressure is a function—stem load, position, and friction—may not have to be measured.

The converter input signal may also be made insensitive to routine changes in plug position. Changes in plug travel typically do not result in long-term changes in the converter input signal. When a fluid regulation system changes its stem position, the converter input signal initially shows a short deviation from its previous value but then returns to the converter input signal level as before (unless the actuator is being asked to work harder).

Fluid regulation system 100 has a variety of features. For example, by being able to determine one or more conditions of a fluid regulation system while it is in operation, problems (whether present or potential) with the system may be identified without having to take the system off-line, which may be time consuming, labor intensive, and expensive. Also, it may be determined that a fluid regulation system does not need to be taken off-line—for routine inspection, for example—which may save time, labor, and expense. Furthermore, by being able to understand problems with a fluid regulation system before it is taken off-line, plans may be made for time, labor, and/or parts to fix and/or maintain the system, which may provide shorter shutdowns periods, leading to increased throughput.

In other implementations, a fluid regulation system may include fewer, additional, and/or a different arrangement of components. For example, a fluid regulation system may gather data regarding other components of fluid regulator 110, other components of fluid regulator controller 120 (e.g., pneumatic relay 122), supply line 140, the regulated process, or any other appropriate information, by using sensors, signal feedback, or other appropriate techniques. Processor 128 may use this information to determine the appropriate position for plug 112 and/or one or more conditions of the fluid regulation system. As another example, a fluid regulation system may not include a pneumatic relay and/or a servo. The processor may, for example, generate an appropriate input signal for the electric-to-pressure converter. As a further example, a fluid regulation system may not include processor 128 or a processor with all of the capabilities of processor 128. The data regarding the various components and functions of the fluid regulation system may, for example, be sent to a remote site for analysis. As a further example, a fluid regulation system may include a variety of other components to assist in its operations, such as, for example, digital-to-analog converters (DACs), analog-to-digital converters (ADCs), filters, amplifiers, limit switches, and boosters. For instance, a DAC may convert digital control signals from servo 126 to analog signals for electric-to-pressure converter 124. As another example, a fluid regulator may include a cage. As an additional example, one or more sensors may be part of the fluid regulator controller.

Figure 3:
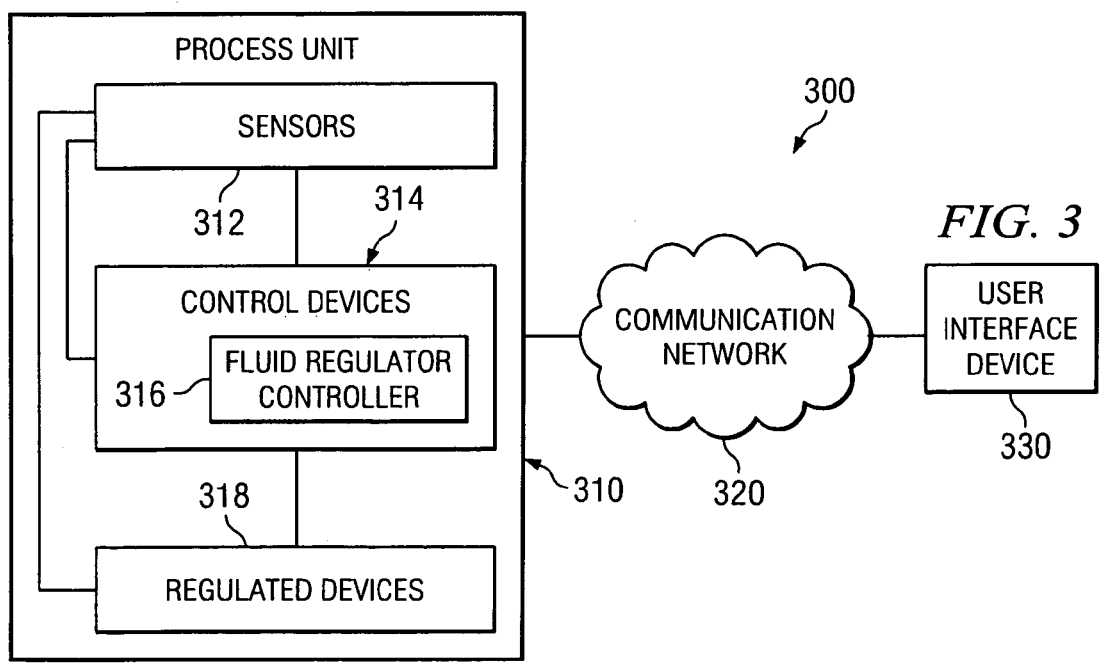
FIG. 3 is a block diagram illustrating another example of a fluid regulation system.

FIG. 3 illustrates one implementation of a system 300 for process management, of which fluid regulation may be a part. System 300 includes a process unit 310, a communication network 320, and a user interface device 330. In general, process unit 310 may control one or more aspects of a process and communicate data regarding itself and/or the controlled process to user interface device 330 through communication network 320.

Process unit 310 includes sensors 312, control devices 314, and regulated devices 318. Sensors 312 may include pressure sensors, temperature sensors, humidity sensors, position sensors, and/or any other appropriate sensing device. Control devices 314 may include fluid regulator controllers, fluid composition controllers, process controllers, and/or any other appropriate process regulator. The control devices may, for example, be composed of servos, processors, actuators, and converters. As illustrated, control devices 314 include a fluid regulator controller 316. Regulated devices 318 may include fluid flow regulators, fluid composition regulators, process regulators, and/or any other appropriate process interactive device.

As illustrated, sensors 312 are coupled to control devices 314 and regulated devices 318 to detect data regarding the regulated devices and the control devices. The data may, for example, be regarding supply pressure, relay output pressure, stem position, and/or temperature. The data from sensors 312 is provided to control devices 314, which make determinations based on the information. For example, the control devices may use the information, along with internally determined information, such as, for example, input and output signals, to determine how to regulate regulated devices 318 or whether there is a problem with one or more of regulated devices 318. If one of regulated devices 318 requires adjustment (e.g., repositioning), control devices 314 may provide the required adjustments.

Communication network 320 is coupled to process unit 310 and may be any appropriate system for exchanging information between process unit 310 and user interface device 330. Communication network 320 may, for example, be a local area network (LAN), a wide are network (WAN), or the Internet. Communication network 320 could also be composed of a number of networks. Communication network 320 may operate using wireline and/or wireless techniques.

User interface device 330 is coupled to communication network 320 and may be any appropriate device for providing information from process unit 310 to a user. In particular implementations, user interface device 330 may also receive information from a user and provide the information to process unit 310. User interface device 330 may, for example, be a personal computer (PC), a workstation, or a personal digital assistant (PDA). User interface device 330 may be located near, remote, or at any other appropriate distance relative to process unit 310 and may or may not be mobile.

User interface device 330 may provide information to a user through a user interface, whether visual, auditory, or otherwise, and receive information through an input device, such as, for example, a keyboard, a keypad, a mouse, a stylus, or a microphone. In particular implementations, user interface device 330 may include a display device (e.g., CRT, LCD, or otherwise) and a keyboard (e.g., QWERTY). Process unit 310 and user interface device 330 may interact with each other by entering into a client-server or peer-to-peer relationship.

User interface device 330 may also be operable to analyze process unit data. For example, the device may receive representations of a converter input signal, a supply pressure, an actuator output pressure, a temperature, and/or a stem position. From these, the user interface device may make one or determinations, such as, for example, that there has been a change in supply pressure or a spring has broken in a fluid regulator. The user interface device may provide indications of the diagnoses to a user of the device.

FIG. 4 illustrates one implementation of a process 400 for fluid regulation. Process 400 may be appropriate for a fluid regulation system including a fluid regulator having a stem and may, for example, illustrate one operational mode of processor 128 in fluid regulation system 100.

Process 400 begins with determining an appropriate position for a stem (operation 404). Determining an appropriate position for a stem may, for example, be accomplished by evaluating instructions regarding a process parameter (e.g., flow rate) to be achieved. Process 400 also calls for generating a command to achieve the stem position (operation 408). The command may be in the form of a signal, which in some implementations may be part of a message.

Process 400 continues with receiving a representation of an electric-to-pressure converter input signal (operation 412). The input signal may, for example, have been generated by a servo that received the command. The representation may be a duplicate of the converter input signal, an attenuated version of the converter input signal, or any other appropriate representation of the signal. Process 400 also calls for receiving an indication of a stem position (operation 416) and receiving an indication of the converter output pressure (operation 420). The stem position and the converter output pressure may be detected by any appropriate sensors. In certain implementations, the converter output pressure may be indicated by a relay output pressure.

Process 400 additionally calls for determining whether it is time to perform a system condition determination (operation 424). The time for performing a system condition determination may be based on an elapsed time since making a previous determination, a detection of a material change in a system parameter, the receipt of a status inquiry, or any other appropriate event. In particular implementations, the sensed system parameters are received much faster than the system condition determinations are performed.

If it is not time to perform a system condition determination, the process calls for determining whether the determined stem position is still appropriate (operation 428). If the determined stem position is not still appropriate, the process continues with determining another appropriate position for the stem (operation 404). If, however, the stem position is still appropriate, the process continues with receiving updates of the system parameters (operations 412-420).

If it is time to perform a system condition determination, process 400 calls for determining at least one condition of the fluid regulation system (operation 432). Example conditions include supply pressure change, converter performance, and fluid regulator health. The conditions are then recorded (operation 436), in semi-permanent memory, for example, and analyzed to determine whether they are acceptable (operation 440). A condition may not be acceptable, for example, if it indicates a malfunction in a fluid regulation system component or if it is out of range. If a condition is not acceptable, an alert message is generated (operation 444). This message may be presented locally and/or sent to a remote device (e.g., a PDA). After the message has been generated, or if the conditions are acceptable, the process continues with determining whether the determined stem position is still appropriate (operation 428).

Although FIG. 4 illustrates one implementation of a process for fluid regulation, other processes for fluid regulation may include fewer, additional, and/or a different arrangement of operations. For example, a process may not determine an appropriate position for a stem. As another example, receiving the indications regarding the system parameters—the converter input signal, the stem position, and the converter output pressure—may occur in any order. As an additional example, an indication may not be received regarding one or more of the system operating parameters. As a further example, indications of other system parameters (e.g., environment temperature) may be received. As another example, determining a system condition may occur if and/or when an indication of a system operating parameter is received. As a further example, system conditions may not be recorded. This may occur, for instance, if the conditions are communicated after they are determined. As an additional example, a message representing one or more system conditions may be generated, perhaps in response to a status query. As another example, a process may determine an appropriate position for a plug.

A number of implementations have been described in detail, and a variety of implementations have been mentioned or suggested. Moreover, other implementations will be readily suggested to those of skill in the art while still achieving fluid regulation. For at least these reasons, the invention is to be measured by the appended claims, which may encompass one or more aspects of one or more of the implementations.

The invention claimed is:

1. A method for fluid regulation, the method comprising:
   receiving a representation of an input signal to an electric-to-pressure converter operable to facilitate positioning of a fluid regulator component, the electric-to-pressure converter adapted to be part of a fluid regulation system comprising a fluid regulator and a fluid regulator controller;
   determining at least one fluid regulation system condition based on the converter input signal, wherein determining at least one fluid regulation system condition comprises determining whether the converter input signal is outside an acceptable range and determining the amount of time that the converter input signal is outside of the acceptable range; and
   diagnosing a mechanical condition based on the fluid regulation system condition.

2. The method of claim 1 wherein diagnosing the mechanical condition includes diagnosing the mechanical condition based on whether the fluid regulation system condition is outside an acceptable variance.

3. The method of claim 1, wherein determining at least one fluid regulation system condition based on the converter input signal comprises determining at least one fluid regulation system condition based on the converter input signal and at least one of a fluid regulator parameter or a fluid regulator controller parameter.

4. The method of claim 1, wherein the fluid regulation system condition comprises a condition of one of a supply pressure, the electric-to-pressure converter, and a fluid regulator.

5. The method of claim 4, wherein determining a supply pressure condition comprises examining the converter input signal level to determine a material variance therefrom.

6. The method of claim 5, wherein determining a supply pressure condition further comprises examining a fluid regulator component position and an output pressure of the electric-to-pressure converter.

7. The method of claim 1, wherein determining whether the converter input signal is outside an acceptable range comprises compensating for normal operating variations of the converter input signal.

8. The method of claim 1, further comprising generating a message representative of the fluid regulation system condition.

9. The method of claim 8, wherein generating a message representative of the fluid regulation system condition comprises generating an alert message if the fluid regulation system condition is unacceptable.

10. A system for fluid regulation, the system comprising:
    an electric-to-pressure converter operable to receive an input signal for positioning a fluid regulator component and to generate an appropriate pressure in response thereto; and
    a processor coupled to the electric-to-pressure converter, the processor operable to:
    receive a representation of the converter input signal;
    determine at least one fluid regulation system condition based on the converter input signal, wherein determining at least one fluid regulation system condition comprises determining whether the converter input signal is outside an acceptable range and determining the amount of time that the converter input signal is outside of the acceptable range; and
    diagnose a mechanical condition based on the fluid regulation system.

11. The system of claim 10 wherein the processor is operable to diagnose the mechanical condition based on whether the fluid regulation system condition is outside an acceptable variance.

12. The system of claim 10, wherein the fluid regulation system condition comprises a condition of one of a supply pressure, the electric-to-pressure converter, and a fluid regulator.

13. The system of claim 12, wherein determining a supply pressure condition comprises examining a fluid regulator component position and an output pressure of the electric-to-pressure converter.

14. The system of claim 10, wherein the processor is further operable to generate a message representative of the fluid regulation system condition.

15. The system of claim 10, wherein determining at least one fluid regulation system condition based on the converter input signal comprises determining at least one fluid regulation system condition based on the converter input signal and at least one of a fluid regulator parameter or a fluid regulator controller parameter.

16. The system of claim 14, wherein:
    the system further comprises a fluid regulator comprising a stem and a position sensor for sensing a position of the stem; and
    the processor is operable to determine the fluid regulation system condition based on the converter input signal and the stem position.

17. The system of claim 14, wherein:
    the stem further comprises a temperature sensor for sensing the temperature of the fluid regulation system environment; and
    the processor is operable to determine the fluid regulation system condition based on the converter input signal and the environment temperature.

18. The system of claim 14, wherein:
    the system further comprises a pressure sensor for sensing the output pressure of the electric-to-pressure converter; and
    the processor is operable to determine the fluid regulation system condition based on the converter input signal and the converter output pressure.

19. A system for fluid regulation, the system comprising:
    a fluid regulator comprising a stem;
    a fluid regulator controller coupled to the fluid regulator controller comprising:
    an electric-to-pressure converter, the converter operable to receive an input signal for positioning the stem and generate an appropriate pressure in response thereto, and
    a processor coupled to the electric-to-pressure converter;
    a position sensor for sensing a position of the stem;
    a temperature sensor for sensing the temperature of the fluid regulation system environment; and
    a pressure sensor operable to sense the output pressure of the electric-to-pressure converter;

wherein the processor is operable to:
  receive a representation of the converter input signal, the stem position, the environment temperature, and the converter output pressure;
  determine at least one fluid regulation system condition based on the converter input signal and one or more of the stem position, the environment temperature, and the converter output pressure, wherein determining at least one fluid regulation system condition comprises determining whether the converter input signal is outside an acceptable range and determining the amount of time that the converter input signal is outside of the acceptable range; and
  diagnose a mechanical condition based on whether fluid regulation system condition.

20. The system of claim 19 wherein the processor is operable to diagnose the mechanical condition based on whether the fluid regulation system condition is outside an acceptable variance.

* * * * *

UNITED STATES PATENT AND TRADEMARK OFFICE
CERTIFICATE OF CORRECTION

PATENT NO. : 7,283,894 B2  Page 1 of 1
APPLICATION NO. : 11/352428
DATED : October 16, 2007
INVENTOR(S) : Sandro Esposito and John Thurman Payne It is certified that error appears in the above-identified patent and that said Letters Patent is hereby corrected as shown below:

Title Page, Item (56) OTHER PUBS,

Page 2, right hand Column, Line 13, replace "SIRPART" with -- SIPART --

Page 2, right hand Column, Line 46, replace "articlePring" with -- articlePrint --

Page 2, right hand Column, Line 52, replace "articlesreprings" with -- articlesreprints --

Col. 2, Line 41, replace "system" with -- stem --

Col. 4, Line 14, replace "amature" with -- armature --

Col. 4, Line 36, replace "(RMA)" with -- (RAM) --

Col. 7, Line 59, replace "measure" with -- measured --

Col. 5, Line 11, replace "generated" with -- generates --

Col. 12, Line 31, replace "claim 14" with -- claim 15 --

Col. 12, Line 38, replace "claim 14" with -- claim 15 --

Col. 12, Line 45, replace "claim 14" with -- claim 15 --

Col. 12, Line 54, after "coupled to the fluid regulator" insert -- ,the fluid regulator --

Signed and Sealed this

Twenty-second Day of July, 2008

JON W. DUDAS
*Director of the United States Patent and Trademark Office*